United States Patent
Zheng et al.

(10) Patent No.: US 10,542,467 B2
(45) Date of Patent: Jan. 21, 2020

(54) METHOD AND DEVICE FOR ESTABLISHING A BEARER

(71) Applicant: ZTE Corporation, Shenzhen (CN)

(72) Inventors: Fangting Zheng, Shenzhen (CN); Minya Ye, Shenzhen (CN); Weidong Liu, Shenzhen (CN); Yang Yang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/328,926

(22) PCT Filed: Dec. 8, 2014

(86) PCT No.: PCT/CN2014/093309
§ 371 (c)(1),
(2) Date: Jan. 25, 2017

(87) PCT Pub. No.: WO2015/117490
PCT Pub. Date: Aug. 13, 2015

(65) Prior Publication Data
US 2017/0215112 A1 Jul. 27, 2017

(30) Foreign Application Priority Data
Jul. 31, 2014 (CN) .......................... 2014 1 0375082

(51) Int. Cl.
*H04W 36/00* (2009.01)
*H04W 76/15* (2018.01)
*H04W 76/10* (2018.01)

(52) U.S. Cl.
CPC ....... *H04W 36/0055* (2013.01); *H04W 76/15* (2018.02); *H04W 76/10* (2018.02)

(58) Field of Classification Search
CPC ............ H04W 36/0055; H04W 76/15; H04W 76/025; H04W 36/0066; H04W 36/0027;
(Continued)

(56) References Cited

U.S. PATENT DOCUMENTS

| 2007/0160008 A1* | 7/2007 | Burgess ................ H04W 36/10 370/331 |
| 2009/0129342 A1* | 5/2009 | Hwang ............. H04W 36/0022 370/331 |

(Continued)

FOREIGN PATENT DOCUMENTS

| CN | 101365182 A | 2/2009 |
| CN | 101800961 A | 8/2010 |

(Continued)

OTHER PUBLICATIONS

International Search Report for corresponding Application No. PCT/CN2014/093309 filed on Dec. 8, 2014; dated May 8, 2015.
(Continued)

*Primary Examiner* — George Eng
*Assistant Examiner* — Umair Ahsan
(74) *Attorney, Agent, or Firm* — Cantor Colburn LLP

(57) ABSTRACT

The disclosure discloses a method and device for establishing a bearer. The method includes: determining that a bearer is to be newly established during a switching process of a terminal; and sending a switching request message to a target base station to which the terminal is to be switched, moreover the switching request message carries the bearer to be newly established, and the switching request message is used for enabling the target base station to establish all bearers designated during the switching request message for the terminal.

4 Claims, 4 Drawing Sheets

(58) Field of Classification Search
CPC ......... H04W 72/0426; H04W 72/0433; H04W 76/10; H04W 36/00; H04W 36/0022; H04W 36/385
See application file for complete search history.

(56) References Cited

U.S. PATENT DOCUMENTS

| | | | | | |
|---|---|---|---|---|---|
| 2009/0316656 | A1* | 12/2009 | Zhao | ..................... | H04W 28/22 370/331 |
| 2010/0074129 | A1* | 3/2010 | Wang | ................ | H04W 36/0055 370/252 |
| 2011/0116478 | A1* | 5/2011 | Zhang | ............... | H04W 36/0055 370/331 |
| 2012/0164979 | A1* | 6/2012 | Bachmann | ............ | H04L 63/164 455/411 |
| 2013/0051368 | A1* | 2/2013 | Liu | .................. | H04W 36/0022 370/331 |
| 2013/0189981 | A1 | 7/2013 | Suzuki | | |
| 2014/0078898 | A1* | 3/2014 | Anchan | ............. | H04W 28/0268 370/230 |
| 2016/0021587 | A1* | 1/2016 | Vargantwar | ........... | H04W 36/14 370/331 |
| 2016/0353350 | A1* | 12/2016 | Engstrom | ............. | H04W 36/32 |

FOREIGN PATENT DOCUMENTS

| | | |
|---|---|---|
| CN | 101854687 A | 10/2010 |
| CN | 102238676 A | 11/2011 |

OTHER PUBLICATIONS

European Search Report for corresponding application EP14881554; Report dated May 29, 2017.

* cited by examiner

METHOD AND DEVICE FOR ESTABLISHING A BEARER

TECHNICAL FIELD

The disclosure relates to the field of communications, and in particular to a method and device for establishing a bearer.

BACKGROUND

A project of the next generation mobile radio network in a third generation partnership project (3GPP) is a system architecture evolution (SAE). FIG. 1 shows a schematic diagram of an SAE architecture. As shown in FIG. 1, the SAE architecture includes but not limits to the following network elements:

Evolved radio access network (E-RAN) provides a higher uplink and downlink rate, lower transmission delay and more reliable radio transmission. A network element included in the E-RAN is an evolved NodeB (eNodeB), which provides radio resource of an access of a terminal.

A home subscriber server (HSS) is arranged to permanently store a subscriber data.

A mobility management entity (MME) is a control plane functional entity and is also a service for temporarily storing user data. The MME is arranged to manage and store context of an user equipment (UE) (for example: UE/user identifier, mobility management state and user security parameter etc.), allocate a temporary identifier for users. Furthermore, when the UE is in a tracking area or a network is in charge of authenticating the users, the MME processes all the non-access layer messages between the MME and the UE, and trigger a paging in the SAE.

A serving gateway is a user plane entity, which is in charge of a user plane data routing process, ending downlink data of the UE in an idle state, managing and storing a context of the SAE bearer of the UE, for example: interne protocol (IP) bearer service parameters and network internal routing information and so on. The serving gateway is further an anchor of an user plane in the 3GPP system, and each user is configured with only one serving gateway at one moment.

A grouped data network gateway (PDN GW) is a gateway that in charge of accessing of the UE to the PDN, allocating user IP address, and is further a mobile anchor in a 3GPP and non 3GPP access system. And users can access to multiple PDN GW at the same time.

A policy and charging rule functionality (PCRF), which generates, according to service information, subscriber information and configuration information of an operator, quality of service rules and charging rules used for controlling user data transmission. And the functionality further controls establishing and releasing of a bearer in the access network.

Service of voice, video etc. based on an IP can be provided by allocating an IP multimedia subsystem (IMS) network in the next generation mobile network, to replace a circuit switched (CS) domain in a 2G/3G network. The voice service of the terminal can be transmitted through an LTE bearer. Currently, mainstream operator allocates a special access point name (APN) for long-term evolution bearer voice (VoLTE), the network and the terminal establish a default bearer that a QoS class identifier (QCI) is 5 for the APN, which is used for transmitting a signaling needed by a user when registered in the IMS network, called a signaling bearer. When the terminal calls or be called, a special bearer that the QCI is 1 is established temporarily for the terminal, which is used for transmitting a voice data, called a voice bearer. When the calling is finished, the voice bearer is released.

When the user calls or be called, a voice bearer is established for the terminal by the network, thus, a call establishing time delay is very long. If the terminal is on the cell edge and in a switching process, a VoLTE calling occurs, then a conflict between the switching process and the voice bearer establishing process on the network side will occur. According to a standard realizing manner in current 3GPP, the switching process is finished by a base station at first, the NAS message is discarded during the switching process, and the voice bearer establishing process may be given up or delayed by a core network, then the user call will not succeed or the call establishing time delay is prolonged, and user experience is affected.

SUMMARY

The embodiments of disclosure disclose a method and device for establishing a bearer, so as at least to solve a problem how to establish a voice bearer when a conflict between a cell switching and a voice bearer establishing process occurs.

In an embodiment of the disclosure, a method for establishing a bearer is provided.

Based on an embodiment of the disclosure, the method for establishing a bearer includes: determining that a bearer is to be newly established during a switching process of a terminal; and sending a switching request message to a target base station to which the terminal is to be switched, wherein the switching request message carries the bearer to be newly established, and the switching request message is used for enabling the target base station to establish all bearers designated in the switching request message for the terminal.

In an example embodiment, the switching request message further carries identifier information of the bearer to be newly established, wherein, the identifier information is used for distinguishing the bearer to be newly established and re-established bearer during the switching process.

In an example embodiment, determining that the bearer is to be newly established during the switching process of the terminal includes: after respectively receiving a switching request initiated by a source base station corresponding to the terminal and a bearer establishing request from a serving gateway corresponding to the terminal, judging whether the terminal is executing a switching operation and the switching request message is not transmitted to the target base station yet; when determining that the terminal is executing the switching operation and the switching request message is not transmitted to the target base station yet, establishing a bearer resource for the terminal.

In another embodiment of the disclosure, another method for establishing a bearer is provided.

Based on the embodiment of the disclosure, the method for establishing a bearer includes: receiving a switching request message from a mobility management entity, wherein, the switching request message carries a bearer to be newly established during a switching process of a terminal; and establishing all bearers designated in the switching request message for the terminal.

In an example embodiment, the switching request message further carries identifier information of the bearer to be newly established, wherein, the identifier information is used for distinguishing the bearer to be newly established and re-established bearer during the switching process.

In another embodiment of the disclosure, a device for establishing a bearer is provided.

Based on the embodiment of the disclosure, the device for establishing a bearer includes: a determining component, arranged to determine that a bearer is to be newly established during a switching process of a terminal; and a sending component, arranged to send a switching request message to a target base station to which the terminal is to be switched, wherein, the switching request message carries the bearer to be newly established, and the switching request message is used for enabling the target base station to establish all bearers designated in the switching request message for the terminal.

In an example embodiment, the switching request message further carries identifier information of the bearer to be newly established, wherein, the identifier information is used for distinguishing the bearer to be newly established and re-established bearer during the switching process.

In an example embodiment, the determining component includes: a judging unit, arranged to, after respectively receiving a switching request initiated by a source base station corresponding to the terminal and a bearer establishing request from a serving gateway corresponding to the terminal, judge whether the terminal is executing a switching operation and the switching request message is not transmitted to the target base station yet; and an establishing unit, arranged to establish a bearer resource for the terminal when determining that the terminal is executing the switching operation and the switching request message is not transmitted to the target base station yet.

In another embodiment of the disclosure, another device for establishing a bearer is provided.

Based on the embodiment of the disclosure, the device for establishing a bearer includes: a receiving component, arranged to receive a switching request message from a mobility management entity, wherein, the switching request message carries a bearer to be newly established during a switching process of a terminal; and an establishing component, arranged to establish all bearers designated in the switching request message for the terminal.

In an example embodiment, the switching request message further carries identifier information of the bearer to be newly established, wherein, the identifier information is used for distinguishing the bearer to be newly established and re-established bearer during the switching process.

According to the embodiment of the disclosure, determining that a bearer is to be newly established during the switching process of the terminal; and sending a switching request message to a target base station to which the terminal is to be switched, wherein the switching request message carries the bearer to be newly established, and the switching request message is used for enabling the target base station to establish all bearers designated in the switching request message for the terminal, solving the problem how to establish the voice bearer when the conflict between the cell switching and the voice bearer establishing process occurs, then the voice bearer can be established simultaneously by a network side during the switching process of the terminal, thereby improving a call dial-up rate, shortening a call establishing time delay, and improving user experience.

BRIEF DESCRIPTION OF THE DRAWINGS

The drawings here are used for the further description of the disclosure, being part of the disclosure, the embodiment and description of the disclosure is used for describing the disclosure and not for limiting the scope of protection of the disclosure. In drawings.

DETAILED DESCRIPTION

The disclosure is described below with reference to the drawings and the embodiment, it needs to be noted that embodiments and characteristics in the embodiments can be combined mutually in condition of no conflict.

Figure 1:
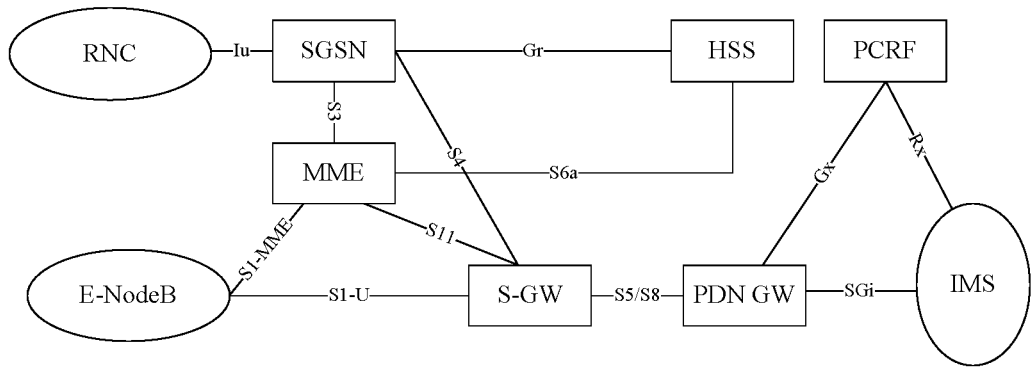
FIG. 1 shows a schematic diagram of an SAE architecture.
Figure 2:
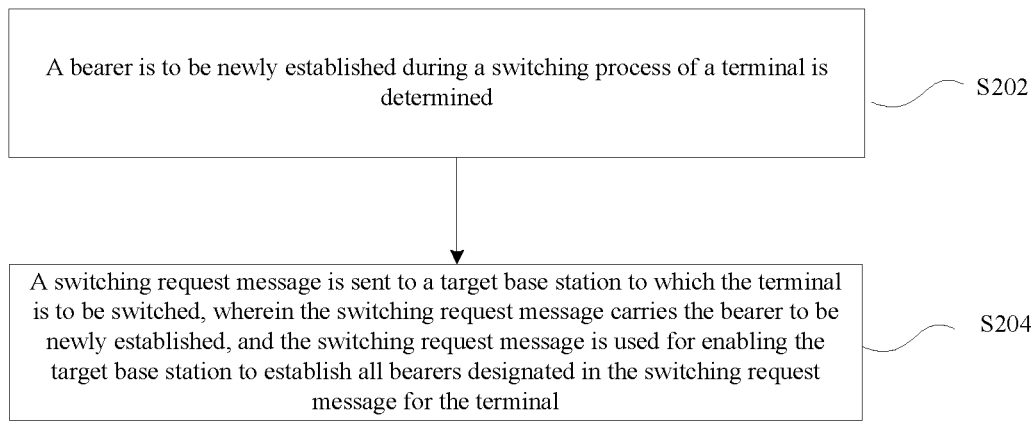
FIG. 2 shows a flowchart of a method for establishing a bearer in an embodiment of the disclosure.

FIG. 2 shows a flowchart of a method for establishing a bearer in an embodiment of the disclosure, as shown in FIG. 2, the method includes the following steps:

Step S202: a bearer is to be newly established during a switching process of a terminal is determined;

Step S204: a switching request message is sent to a target base station to which the terminal is to be switched, moreover the switching request message carries the bearer to be newly established, and the switching request message is used for enabling the target base station to establish all bearers designated in the switching request message for the terminal.

As mentioned above, the problem how to establish a voice bearer when a conflict between a cell switching and a voice bearer establishing process occurs existed, according to the method shown in FIG. 2, the MME determines the bearer is to be newly established during the switching process, then the bearer to be newly established is carried in the switching request by the MME, and all bearers designated by the MME are established for the user by the target eNodeB, solving the problem how to establish the voice bearer when the conflict between the cell switching and the voice bearer establishing process occurs, then the voice bearer can be established simultaneously by the network side during the switching process of the terminal, thereby improving a call dial-up rate, shortening a call establishing time delay, and improving user experience.

In an example embodiment, the switching request message further carries identifier information of the bearer to be newly established, moreover, the identifier information is used for distinguishing the bearer to be newly established and re-established bearer during the switching process.

In an example embodiment, in S202, a bearer is to be newly established during the switching process of the terminal is determined includes:

Step S1: after respectively receiving a switching request initiated by a source base station corresponding to the terminal and a bearer establishing request from a serving gateway corresponding to the terminal, whether the terminal is executing the switching operation and a switching request message is not transmitted to the target base station yet is judged;

Step S2: when determining that the terminal is executing the switching operation and the switching request message is not transmitted to the target base station yet, a bearer resource for the terminal established.

In an example embodiment, a source side base station initiates a switching request to a source side mobility management entity, and then the source side mobility management entity receives a bearer establishing request from a source side serving gateway. After that, when the source side mobility management entity determine that the current terminal is in the switching process and the switching request is not transmitted to the target base station yet, the source side mobility management entity can establish the bearer resource for the terminal and return a bearer establishing response to the source side serving gateway.

Figure 3:
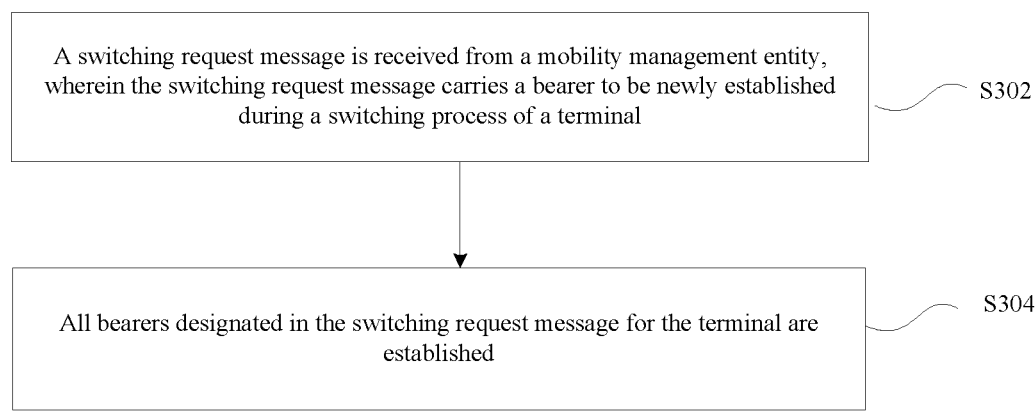
FIG. 3 shows a flowchart of another method for establishing a bearer in an embodiment of the disclosure.

FIG. 3 shows a flowchart of another method for establishing a bearer in an embodiment of the disclosure, as shown in FIG. 3, the method includes the following steps:

Step S302: a switching request message is received from a mobility management entity, moreover the switching request message carries a bearer to be newly established during a switching process of a terminal;

Step S304: all bearers designated in the switching request message for the terminal are established.

In an example embodiment, the switching request message further carries identifier information of the bearer to be newly established, moreover, the identifier information is used for distinguishing the bearer to be newly established and re-established bearer during the switching process.

The above process is further described below with reference to the preferred embodiment shown from FIG. 4 to FIG. 7.

Figure 4:
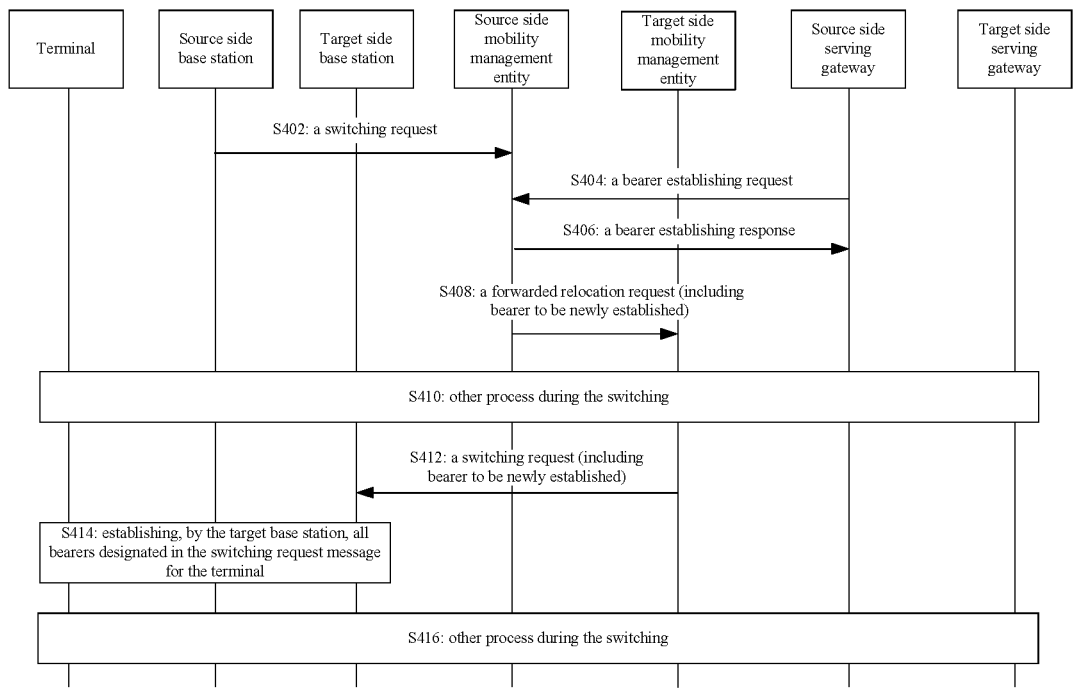
FIG. 4 shows a flowchart of when an MME is changed a conflict process between a S1 switching and a VoLTE called in an embodiment of the disclosure.

FIG. 4 shows a flowchart of when an MME is changed a conflict process between a S1 switching and a VoLTE called in an embodiment of the disclosure, as shown in FIG. 4, a serving gateway may relocate in an S1 switching process when the MME is changed, then in this embodiment, a source side serving gateway and a target side serving gateway can be the same serving gateway, or different serving gateways. The flowchart includes the following steps:

Step S402: the source side base station initiates a switching request to the source side mobility management entity;

Step S404: the source side mobility management entity receives a bearer establishing request from the source side serving gateway;

Step S406: when the source side mobility management entity determines that the current terminal is in the switching process and the switching request is not transmitted to the target base station yet, the source side mobility management entity establishes the bearer resource for the terminal and returns a bearer establishing response to the source side serving gateway;

Step S408: the source side mobility management entity transmits a forwarded relocation request message to a target side mobility management entity, moreover the forwarded relocation request message carries the bearer to be newly established during the switching process;

In an example embodiment, the forwarded relocation request message further carries an identifier of the bearer to be newly established, and the identifier is used for distinguishing the bearer to be newly established and re-established bearer during the switching process.

Step S410: other process during the switching is same to prior process, and need not be repeated here;

Step S412: the target side mobility management entity transmits a switching request message to the target base station, moreover the switching request message carries the bearer to be newly established during the switching process;

In an example embodiment, the switching request message further carries the identifier of the bearer to be newly established, and the identifier is used for distinguishing the bearer to be newly established and re-established bearer during the switching process.

Step S414: the target base station establishes all bearers designated in the switching request message for the terminal;

Step S416: other process during the switching is same to prior process, and need not be repeated here.

Figure 5:
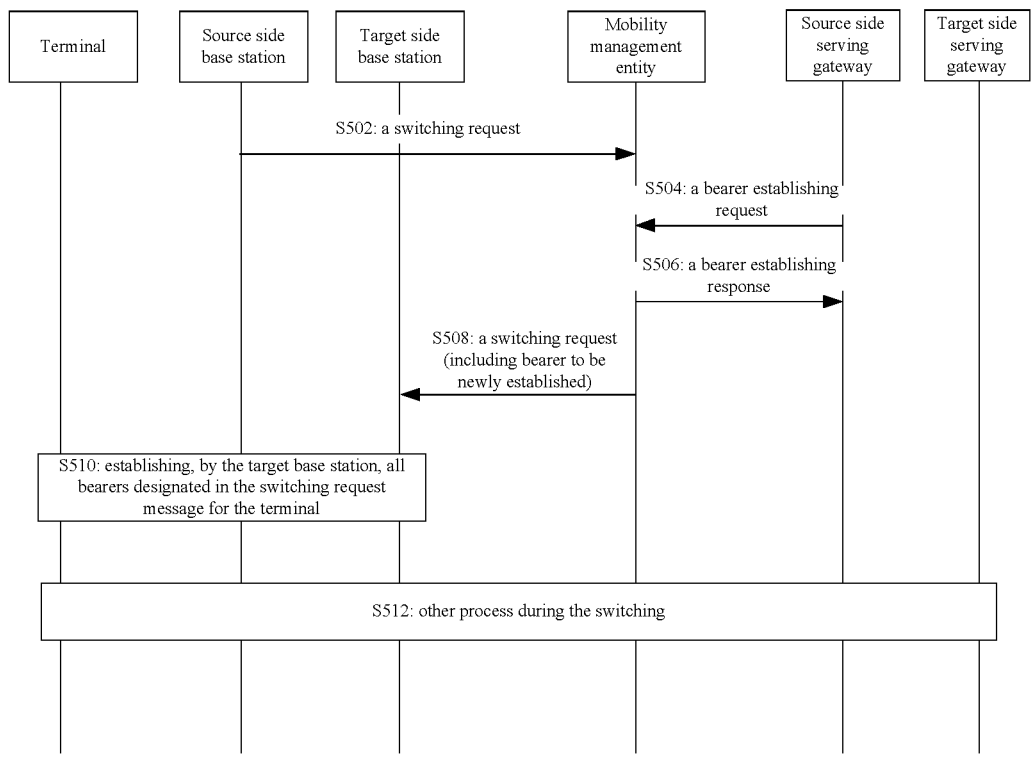
FIG. 5 shows a flowchart of when an MME is not changed a conflict process between a S1 switching and a VoLTE called in an embodiment of the disclosure.

FIG. 5 shows a flowchart of when an MME is not changed a conflict process between a S1 switching and a VoLTE called in an embodiment of the disclosure; as shown in FIG. 5, the serving gateway may relocate in an S1 switching process when the MME is not changed, then in this embodiment, a source side serving gateway and a target side serving gateway can be the same serving gateway, or different serving gateways. The flowchart includes the following steps:

Step S502: the source side base station initiates a switching request to the mobility management entity;

Step S504: the mobility management entity receives a bearer establishing request from the source side serving gateway;

Step S506: when the mobility management entity determines that the current terminal is in the switching process and the switching request is not transmitted to the target base station yet, the source side mobility management entity establishes the bearer resource for the terminal and returns a bearer establishing response to the source side serving gateway;

Step S508: the mobility management entity transmits a switching request message to the target base station, moreover the switching request message carries the bearer to be newly established during the switching process;

In an example embodiment, the switching request message further carries an identifier of the bearer to be newly established, and the identifier is used for distinguishing the bearer to be newly established and re-established bearer during the switching process.

Step S510: the target base station establishes all bearers designated in the switching request message for the terminal;

Step S512: other process during the switching is same to prior process, and need not be repeated here.

Figure 6:
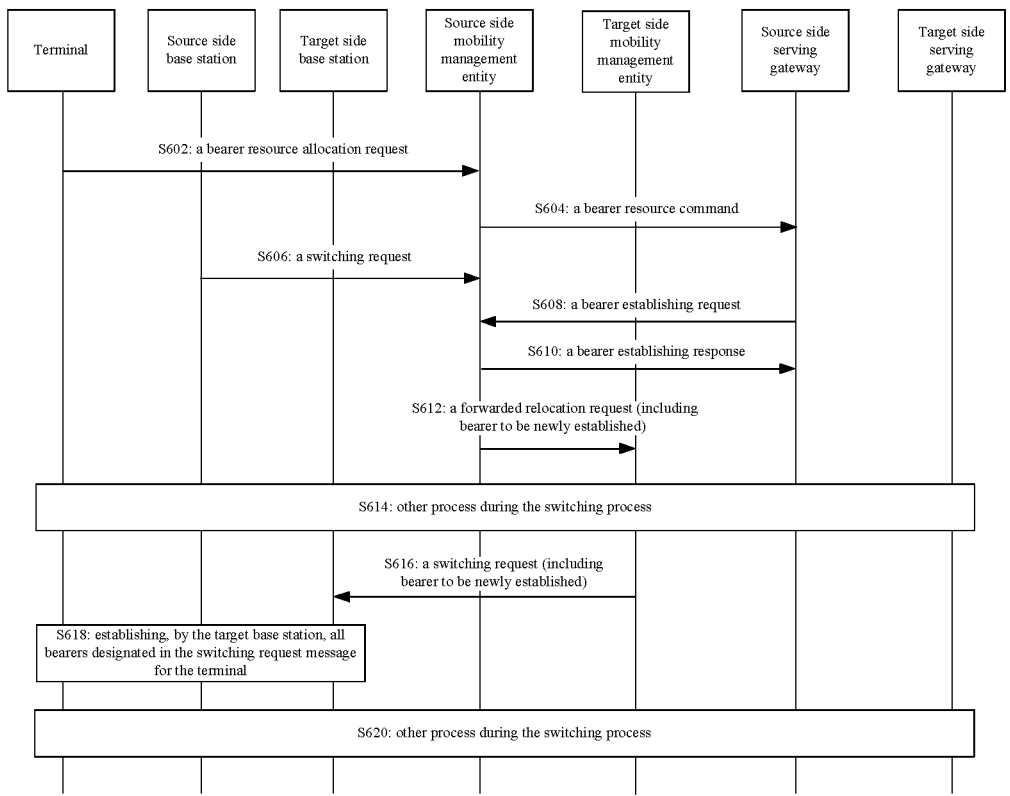
FIG. 6 shows a flowchart of when an MME is changed a conflict process between a S1 switching and a VoLTE calling in an embodiment of the disclosure.

FIG. 6 shows a flowchart of when an MME is not changed a conflict between a S1 switching and a VoLTE calling in an embodiment of the disclosure; as shown in FIG. 6, the serving gateway may relocate in an S1 switching process when the MME is changed, then in this embodiment, a source side serving gateway and a target side serving gateway can be the same serving gateway, or different serving gateways. The flowchart includes the following steps:

Step S602: the terminal initiates a resource allocation request to the source side mobility management entity;

Step S604: the source side mobility management entity initiates a bearer resource command to the source side serving gateway;

Step S606: the source side base station initiates a switching request to the source side mobility management entity;

Step S608: the source side mobility management entity receives a bearer establishing request from the source side serving gateway;

Step S610: when the source side mobility management entity determines that the current terminal is in the switching process and the switching request is not transmitted to the target base station yet, the source side mobility management entity establishes the bearer resource for the terminal and returns a bearer establishing response to the source side serving gateway;

Step S612: the source side mobility management entity transmits a forwarded relocation request message to a target side mobility management entity, moreover the forwarded relocation request message carries the bearer to be newly established during the switching process;

In an example embodiment, the forwarded relocation request message further carries an identifier of the bearer to be newly established, and the identifier is used for distinguishing the bearer to be newly established and re-established bearer during the switching process.

Step S614: other process during the switching is same to prior process, and need not be repeated here;

Step S616: the target side mobility management entity transmits a switching request message to the target base station, moreover the switching request message carries the bearer to be newly established during the switching process;

In an example embodiment, the switching request message further carries an identifier of bearer to be newly established, and the identifier is used for distinguishing the bearer to be newly established and re-established bearer during the switching process.

Step S618: the target base station establishes all bearers designated in the switching request message for the terminal;

Step S620: other process during the switching is same to prior process, and need not be repeated here.

Figure 7:
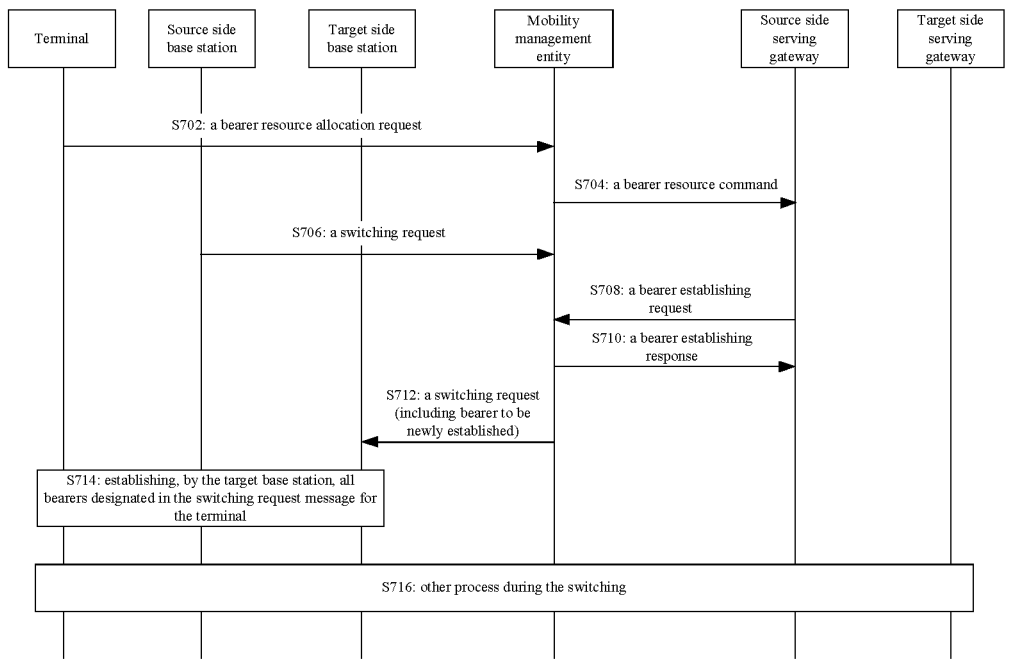
FIG. 7 shows a flowchart of when the MME is not changed a conflict process between a S1 switching and a VoLTE calling in an embodiment of the disclosure.

FIG. 7 shows a flowchart of when the MME is not changed a conflict between a S1 switching and a VoLTE calling in an embodiment of the disclosure; as shown in FIG. 7, the serving gateway may relocate in an S1 switching process when the MME is not changed, then in this embodiment, a source side serving gateway and a target side serving gateway can be the same serving gateway, or different serving gateways. The flowchart includes the following steps:

Step S702: the terminal initiates a resource allocation request to the mobility management entity;

Step S704: the mobility management entity initiates a bearer resource command to the source side serving gateway;

Step S706: the source side base station initiates a switching request to the mobility management entity;

Step S708: the mobility management entity receives a bearer establishing request from the source side serving gateway;

Step S710: when the mobility management entity determines that the current terminal is in the switching process and the switching request is not transmitted to the target base station yet, the source side mobility management entity establishes the bearer resource for the terminal and returns a bearer establishing response to the source side serving gateway;

Step S712: the mobility management entity transmits a switching request message to the target base station, moreover the switching request message carries the bearer to be newly established during the switching process;

In an example embodiment, the switching request message further carries an identifier of the bearer to be newly established identifier, and the identifier is used for distinguishing the bearer to be newly established and re-established bearer during the switching process.

Step S714: the target base station establishes all bearers designated in the switching request message for the terminal;

Step S716: other process during the switching is same to prior process, need not be repeated here.

Figure 8:
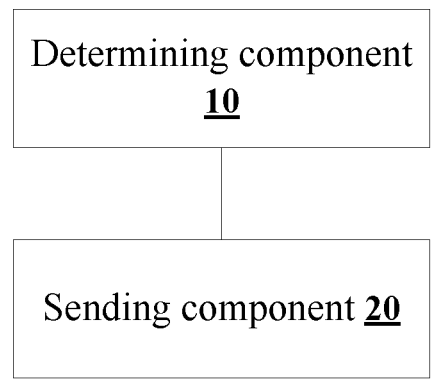
FIG. 8 shows a structural block diagram of a device for establishing a bearer in an embodiment of the disclosure.

FIG. 8 shows a structural block diagram of a device for establishing a bearer in an embodiment of the disclosure, as shown in FIG. 8, the device for establishing a bearer includes: a determining component 10, which is arranged to determine that a bearer is to be newly established during a switching process of a terminal; and a sending component 20, which is arranged to send a switching request message to a target base station to which the terminal is to be switched, moreover the switching request message carries the bearer to be newly established, and the switching request message is used for enabling the target base station to establish all bearers designated in the switching request message for the terminal.

The device shown in FIG. 8 solves the problem how to establish a voice bearer when a conflict between a cell switching and a voice bearer establishing process occurs, then a voice bearer can be established simultaneously by a network side during the switching process of the terminal, thereby improving a call dial-up rate, shortening a call establishing time delay, and improving user experience.

In an example embodiment, the switching request message further carries identifier information of the bearer to be newly established, moreover, the identifier information is used for distinguishing the bearer to be newly established and re-established bearer during the switching process.

Figure 9:
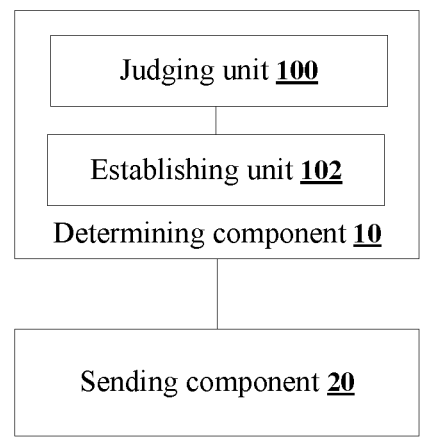
FIG. 9 shows a structural block diagram of a device for establishing a bearer in an example embodiment of the disclosure.

In an example embodiment, as shown in FIG. 9, the determining component 10 includes: a judging unit 100, arranged to, after receiving a switching request initiated by a source base station corresponding to the terminal and a bearer establishing request from a serving gateway corresponding to the terminal respectively, judge whether the terminal is executing a switching operation and the switching request message is not transmitted to the target base station yet; and an establishing unit 102, which is arranged to establish a bearer resource for the terminal when determining that the terminal is executing the switching operation and the switching request message is not transmitted to the target base station yet.

Figure 10:
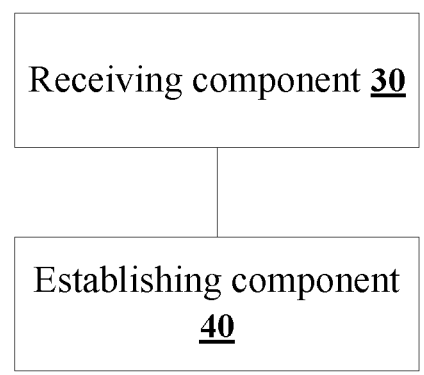
FIG. 10 shows a structural block diagram of another device for establishing a bearer in an embodiment of the disclosure.

FIG. 10 shows a structural block diagram of another device for establishing a bearer in an embodiment of the disclosure, as shown in FIG. 10, the device for establishing a bearer includes: a receiving component 30, which is arranged to receive a switching request message from a mobility management entity, moreover the switching request message carries a bearer to be newly established during a switching process of a terminal; and an establishing component 40, which is arranged to establish all bearers designated in the switching request message for the terminal.

In an example embodiment, the switching request message further carries identifier information of the bearer to be newly established, moreover, the identifier information is used for distinguishing the bearer to be newly established and re-established bearer during the switching process.

Based on above description, the embodiments realize the following technical effects (It needs to be noted that effects are realized in some example embodiments): the technical solution provided by the embodiments of the disclosure is adaptive to a scene that a conflict between the S1 switching process of the MME network element and special bearer establishing process of the SGW occurs, thereby improving the call dial-up rate, shortening the call establishing time delay of user in the VoLTE calling or called during the switching process, and improving the user experience.

Certainly, the skilled person in the art should understand that each component or step of the disclosure can be realized through a common calculation device, the components may in a single calculation device, or distributed in a network composed of multiple calculation devices, in an example embodiment, the components or steps are realized through a procedure code executable by the calculation device, then stored in a storing device and executed by a calculation device, in a certain condition, the shown or described steps are executed in a different order, or components are prepared into each integrated circuit component, or multiple components or steps are prepared into a single integrated circuit component. Thus, the disclosure is not limit to a specific hardware and software combination.

The above is only the example embodiments of the disclosure and not intended to limit the scope of protection of the disclosure, the skilled person in the art can modify and change, and any modifications, equivalent replacements, improvements and the like within the spirit and principle of the disclosure shall fall within the scope of protection of the disclosure.

INDUSTRIAL APPLICABILITY

The beneficial effect of the method and device for establishing a bearer of the disclosure is as the follows: a voice bearer can be established simultaneously by a network side during a switching process of the terminal, thereby improving a call dial-up rate, shortening a call establishing time delay, and improving user experience.

What is claimed is:

1. A method for establishing a bearer, comprising:
    determining that a bearer is to be newly established during a switching process of a terminal, wherein the bearer to be newly established is a voice bearer which is used for transmitting a voice data; and
    sending a switching request message to a target base station to which the terminal is to be switched, wherein the switching request message carries the voice bearer and a bearer to be re-established, and the switching request message is used for enabling the target base station to establish all bearers designated in the switching request message for the terminal;
    wherein determining that the bearer is to be newly established during the switching process of the terminal comprises: after respectively receiving a switching request initiated by a source base station corresponding to the terminal and a bearer establishing request from a source serving gateway corresponding to the terminal, judging whether the terminal is executing a switching operation and the switching request message is not transmitted to the target base station yet; when determining that the terminal is executing the switching operation and the switching request message is not transmitted to the target base station yet, establishing a bearer resource for the terminal, wherein the bearer resource refers to the voice bearer resource;
    establishing all bearers designated in the switching request message for the terminal which includes the voice bearer and the bearer to be re-established by the target base station.

2. The method as claimed in claim 1, wherein, the switching request message further carries identifier information of the bearer to be newly established, wherein, the identifier information is used for distinguishing the bearer to be newly established and the re-established bearer, which is corresponding to the switching process, during the switching process.

3. A device for establishing a bearer, comprising:
    a determining component, arranged to determine that a bearer is to be newly established during a switching process of a terminal, wherein the bearer to be newly established is voice bearer which is used for transmitting a voice data; and
    a sending component, arranged to send a switching request message to a target base station to which the terminal is to be switched, wherein, the switching request message carries the voice bearer and a bearer to be reestablished, and the switching request message enables the target base station to establish all bearers designated in the switching request message for the terminal;
    wherein the determining component comprises: a judging unit, arranged to, after respectively receiving a switching request initiated by a source base station corresponding to the terminal and a bearer establishing request from a source serving gateway corresponding to the terminal, judge whether the terminal is executing a switching operation and the switching request message is not transmitted to the target base station vet, and an establishing unit, arranged to establish a bearer resource for the terminal when determining that the terminal is executing the switching operation and the switching request message is not transmitted to the target base station vet, wherein the bearer resource refers to the voice bearer resource; and the establishing unit, arranged to establish all bearers designated in the switching request message for the terminal which includes the voice bearer and the bearer to be re-established by the target base station.

4. The device as claimed in claim 3, wherein, the switching request message further carries identifier information of the bearer to be newly established, wherein, the identifier information is used for distinguishing the bearer to be newly established and the re-established bearer, which is corresponding to the switching process, during the switching process.

* * * * *